US006816737B2

United States Patent
Kim

(10) Patent No.: US 6,816,737 B2
(45) Date of Patent: Nov. 9, 2004

(54) METHOD FOR RETRIEVING MESSAGE IN MOBILE TELECOMMUNICATION TERMINAL

(75) Inventor: Jong-Gon Kim, Kwangju-kwangyokshi (KR)

(73) Assignee: Samsung Electronics Co., Ltd. (KR)

( * ) Notice: Subject to any disclaimer, the term of this patent is extended or adjusted under 35 U.S.C. 154(b) by 422 days.

(21) Appl. No.: 09/946,694

(22) Filed: Sep. 5, 2001

(65) Prior Publication Data

US 2002/0006784 A1 Jan. 17, 2002

(30) Foreign Application Priority Data

Sep. 6, 2000 (KR) .................................. P2000-52690

(51) Int. Cl.$^7$ ............................................. H04Q 7/20
(52) U.S. Cl. ................................................. 455/466
(58) Field of Search ..................... 455/412.1, 412.2, 455/413, 466; 379/67.1, 88.28; 709/217

(56) References Cited

U.S. PATENT DOCUMENTS 5,844,499 A * 12/1998 Min ........................... 340/7.52
6,442,600 B1 * 8/2002 Anderson ................... 709/217
6,549,769 B1 * 4/2003 Harder ........................ 455/418

* cited by examiner

Primary Examiner—Fan Tsang
Assistant Examiner—Ming Chow
(74) Attorney, Agent, or Firm—Dilworth & Barrese, LLP

(57) ABSTRACT

Disclosed is a method for retrieving a deleted short message in a mobile telecommunication terminal. The mobile telecommunication terminal has an additional data area, for indicating whether or not the deleted message is retrievable, in a start address region of each short message storage block within a memory. If a user demands for retrieval of a message, data in the data area identifying retrievability of the message retrieves only the short message retrievable upon the user's demand by referring to the data identifying whether or not the message in a message storage block is retrievable.

7 Claims, 4 Drawing Sheets

METHOD FOR RETRIEVING MESSAGE IN MOBILE TELECOMMUNICATION TERMINAL

BACKGROUND OF THE INVENTION

1. Field of the Invention

The present invention relates generally to a mobile telecommunication terminal, and in particular, to a method for retrieving messages in a mobile telecommunication terminal.

2. Description of the Related Art

Mobile telecommunication terminals have recently been developed into multimedia devices capable of providing various extra services, i.e., transmission/reception of short messages, electronic pocketbook functions, game functions, schedule managing functions, etc., as well as simple call processings. Further, the mobile telecommunication terminals are able to provide E-mail services as well as information search services through wireless Internet, thereby remarkably improving their convenience for use.

In particular, the transmission/reception of short messages in a mobile telecommunication terminal is the most widely used function among all the functions of the mobile telecommunication terminal. When a subscriber is in a situation that makes a telephone telecommunication call or has messages to be sent, the subscriber may transmit/receive the messages to/from a communicating partner by using the short message transmission/reception service for the mobile telecommunication terminal.

On the other hand, the short messages received from the communicating partner may be stored or deleted by the subscriber using the mobile telecommunication terminal. Since the once-deleted messages are deleted on a permanent basis, the user can not retrieve the messages even when deleted by mistake or later when necessitated.

SUMMARY OF THE INVENTION

It is, therefore, an object of the present invention to provide a method for easily retrieving deleted messages when the deleted messages are later necessary.

To achieve the above object, there is provided a method for retrieving deleted short messages in a mobile telecommunication terminal. The mobile telecommunication terminal has an additional data area, for identifying whether or not the deleted messages are retrievable, in a start address region of each short message storage block within a memory. If a user demands retrieval of a message, data in the data area identifying whether or not a message is retrievable displays a possibility of retrieving the short message(s). Then, according to the user's demand, the message(s) is (are) retrieved by referring to the data identifying whether or not the message in the message storage block is retrievable.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
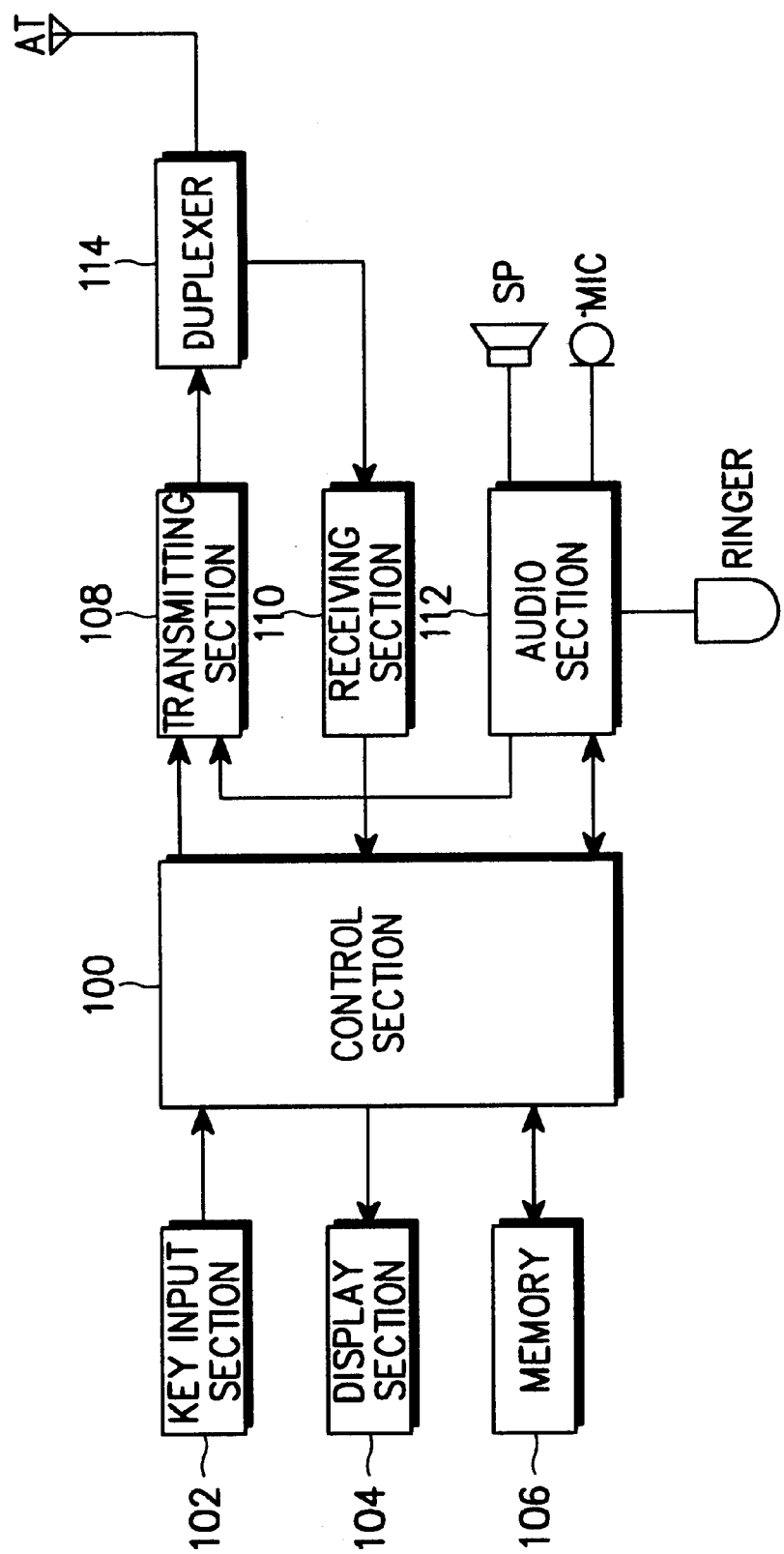
FIG. 1 is a block diagram illustrating a construction of a mobile telecommunication terminal according to a preferred embodiment of the present invention.

FIG. 1 is a block diagram illustrating a construction of a mobile telecommunication terminal according to a preferred embodiment of the present invention. Referring to FIG. 1, a control section 100 controls overall operations of the mobile telecommunication terminal. A memory 106 storing a predetermined program for controlling the overall operations of the terminal telecommunication terminal stores data, inputted/outputted when the overall operations are performed under the control of the control section 100, in predetermined regions. Further, the memory 106 comprises an EEP-Rom for storing short messages.

Figure 2:
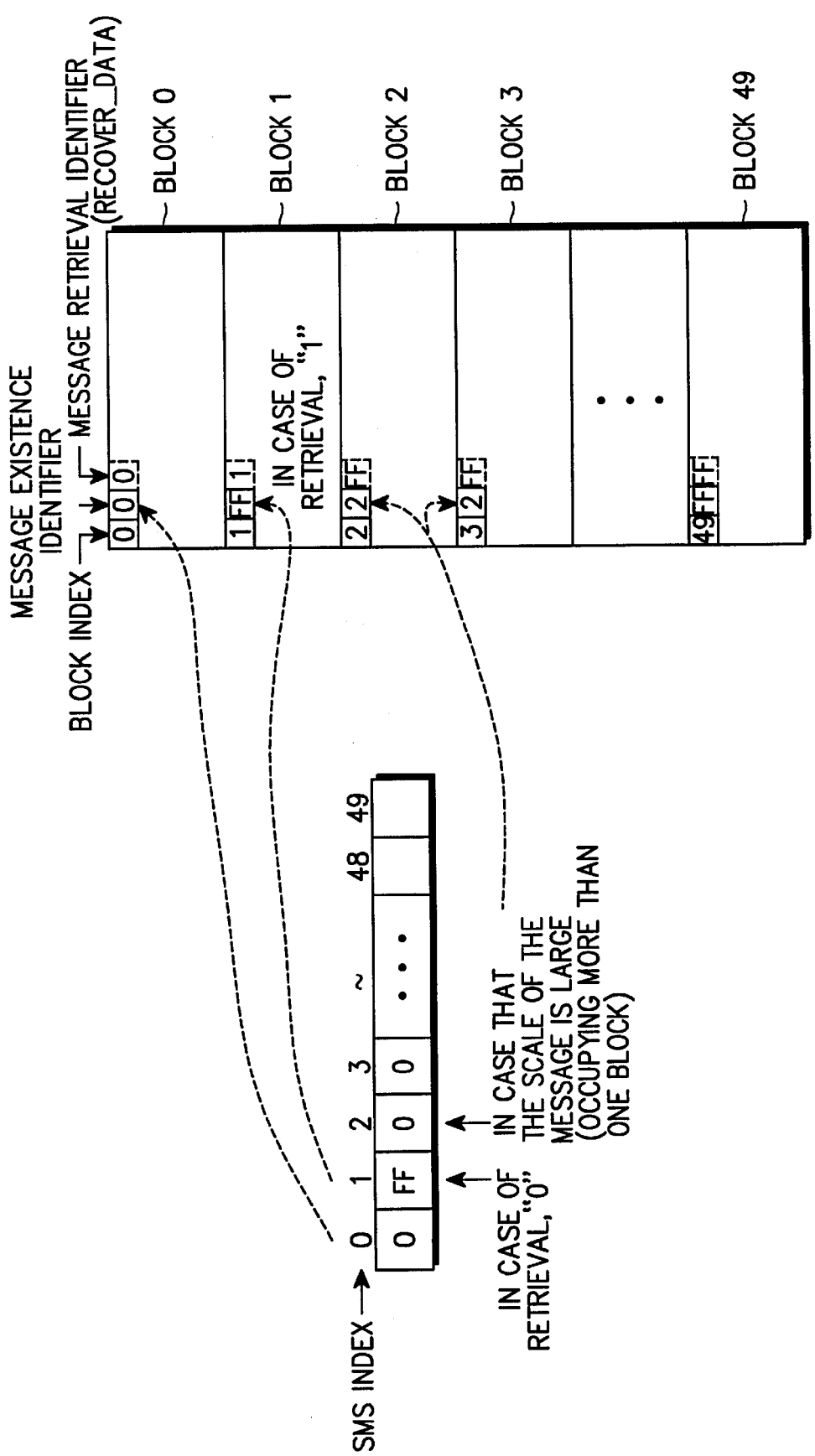
FIG. 2 is a diagram illustrating a data format of a message storage block within a memory according to a preferred embodiment of the present invention.

If a certain short message is inputted, the EEP-Rom divided into blocks of a regular size as shown in FIG. 2 stores the pertinent short message in an empty block. Each short message storage block in the EEP-Rom includes a block index, a message existence identifier and a message retrieval identifier in a start address memory region of the memory block. The block index registers serial numbers of the respective blocks. The message existence identifier identifies whether or not there exists a message currently stored in a pertinent block. If currently stored, the message existence identifier registers an SMS index number of the stored short message, if not currently stored, it registers "FF". The "FF" is only an example that the data for representing the message is not stored. Therefore, it is out of the question that the data can be expressed with any hexadecimal except for decimal 0–49.

As shown in FIG. 2, blocks indicated as "BLOCK 0"–"BLOCK 49" are short message storage blocks, and the left part of FIG. 2 illustrates a message stored status identifier. If a message of a SMS (short message service) index number is stored in the short message shortage blocks, "0" is registered in the message stored status identifier. Meanwhile, if the message of the SMS index number is not stored in the short message storage blocks, "FF" is registered in the message stored status identifier. Therefore, control section 100 can identify whether or not a message of the SMS index corresponding to the message stored status identifier is stored in the short message storage blocks, by checking a value registered in the message stored status identifier.

For example, as shown in FIG. 2, since the message corresponding to the SMS index 0 is stored in the short message storage block BLOCK 0 of "block index 0", the value of the message stored status identifier corresponding to the SMS index 0 is registered to "0". Also, since the message corresponding to the SMS index 1 is deleted in the short message storage block BLOCK 1 of the "block index 1", the value of the message stored status identifier corresponding to the SMS index 1 is registered to "FF". If the message corresponding to the SMS index 1 is retrieved in the short message storage block BLOCK 1 of "block index 1", the value of the message stored status identifier corresponding to the SMS index 1 is changed to be "0". Also, since the message of the SMS index 2 is stored in the short message storage block BLOCK 2,3 of "block index 2,3", the value of the message stored status identifier corresponding to the SMS index 2 is registered to be "0".

The message retrieval identifier is data newly included in the start address memory region of each block to identify whether or not the message has been retrieved. The message retrieval identifier having "FF" as a reference value is set to be a value of the message existence identifier when the stored data is deleted according to the user's demand for deletion thereof, and is re-set to be "FF" when a new message is received, and a previously deleted message and the new message are stored in a pertinent block. The message stored in the EEP-Rom is thus not deleted and only the message existence identifier in the pertinent block is set to be "FF", even if there has been a demand for deletion of the message by a user. Thus, if there has been a demand for a message retrieval by a user, according to a preferred embodiment of the present invention, the control section restores the message existence identifier so as to be matched with the SMS index number, and sets the message stored status identifier matched with the SMS index from "FF" to "0" as to display that there is a short message stored in the pertinent SMS index.

For the purposes of illustration, assume no message is store in a short message storage block (for this example called BLOCK 10) and "FF" is registered in the message existence identifier and the message retrieval identifier of BLOCK 10. After that, if a message is stored in BLOCK 10, the SMS index number corresponding to the stored message (hereinafter called "10") is stored in the message existence identifier of BLOCK 10, and the message retrieval identifier value "FF" is not changed. The message stored status identifier value corresponding to the SMS index number 10 is changed from "FF" to "0". Then if the user deletes the message of the SMS index number 10, the value of the message existence identifier "10" is registered in the message retrieval identifier and the value of the message existence identifier of BLOCK 10 is changed to "FF". This time, the message stored status identifier value corresponding to the SMS index is changed from "0" to "FF", but the message stored in BLOCK 10 remains unchanged.

If the user demands retrieval of the message of the SMS index number 10, the control section 100 searches the short message storage block of the message retrieval identifier value "10" and finds BLOCK 10. Then, the message retrieval identifier value "10" is registered in the message existence identifier of BLOCK 10 and the Value of the message retrieval identifier is changed to "FF". This time, the message stored status identifier value corresponding to the SMS index 10 is changed from "FF" to "0".

Referring again to FIG. 1, a duplexer 114 performs a telecommunication with base stations through an antenna AT, and classifies transmitted/received signals. A receiving section 110 receives radio signals inputted through the antenna AT under a predetermined control, receives radio signals divided by the duplexer 114, and amplifies and filters feeble signals among the amplified signals. A transmitting section 108 filters and amplifies radio signals outputted from an audio section 112, which will be described herein below, through the duplexer 114 under a predetermined control, and transmits the same to the antenna AT. The audio section 112 modulates voice signals inputted through a microphone MIC under the control of the control section 100 into radio signals, and demodulates radio signals received from the receiving section 110 into voice signals, and outputs the voice signals to a speaker SP. Further, when ring signals are generated from the base stations, the receiving section 110 detects the ring signals, and transmits the same through a ringer. A key input section 102 comprising a plurality of numerical keys generates a pertinent key data when a user inputs a predetermined key, and outputs the same to the control section 110. A display section 104 including a liquid crystal display LCD section for displaying various kinds of information under the control of the control section 100, receives and displays key data generated by the key input section 102 and various informational signals transmitted by the control section 100.

Figure 3:
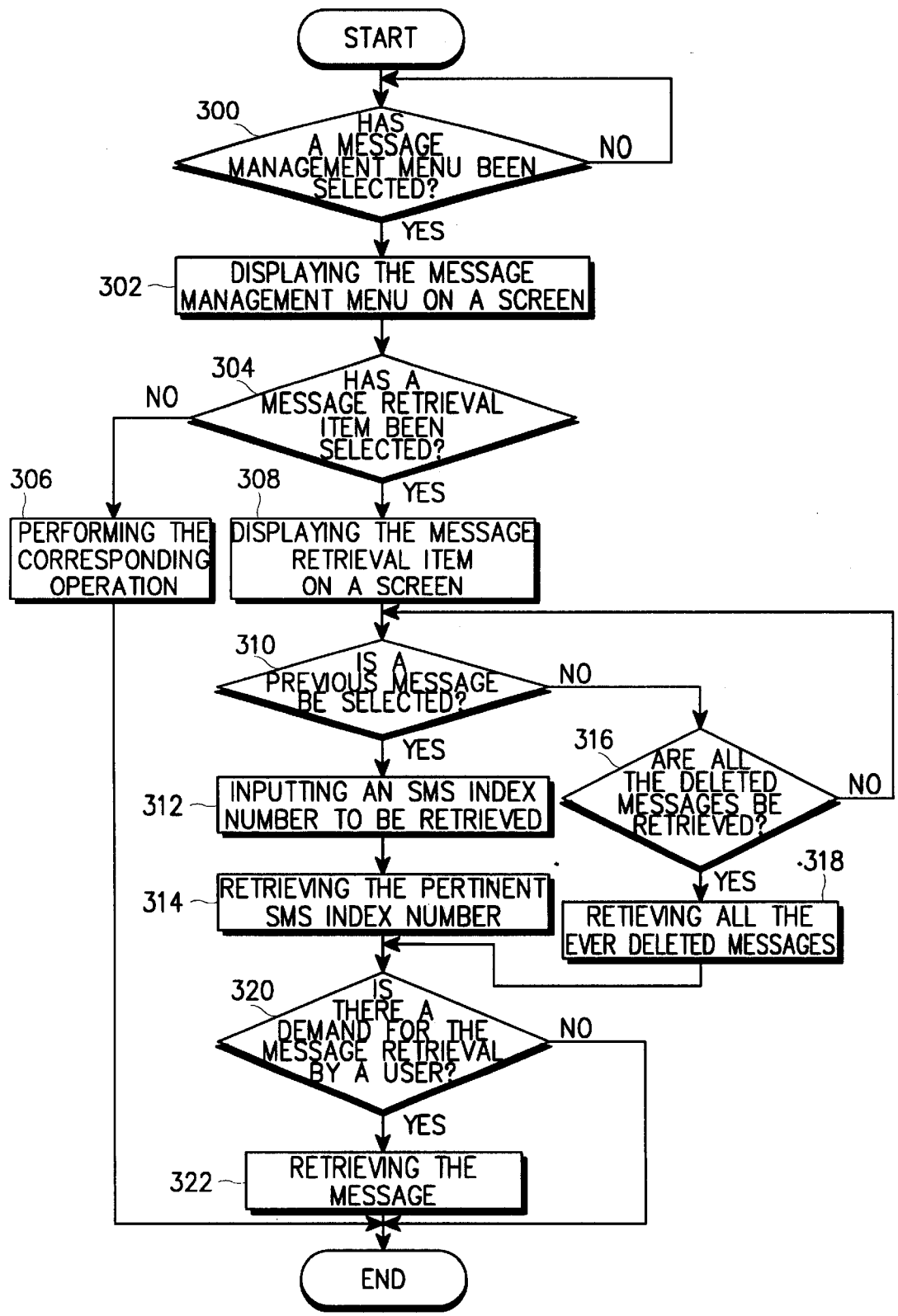
FIG. 3 is a flow chart illustrating a process of message retrieval according to a preferred embodiment of the present invention.

FIG. 3 is a flow chart illustrating a control on operations for a message retrieval in a mobile telecommunication terminal. A preferred embodiment of the present invention will be described in detail herein below with reference to FIGS. 1, 2, and 3.

Figure 4:
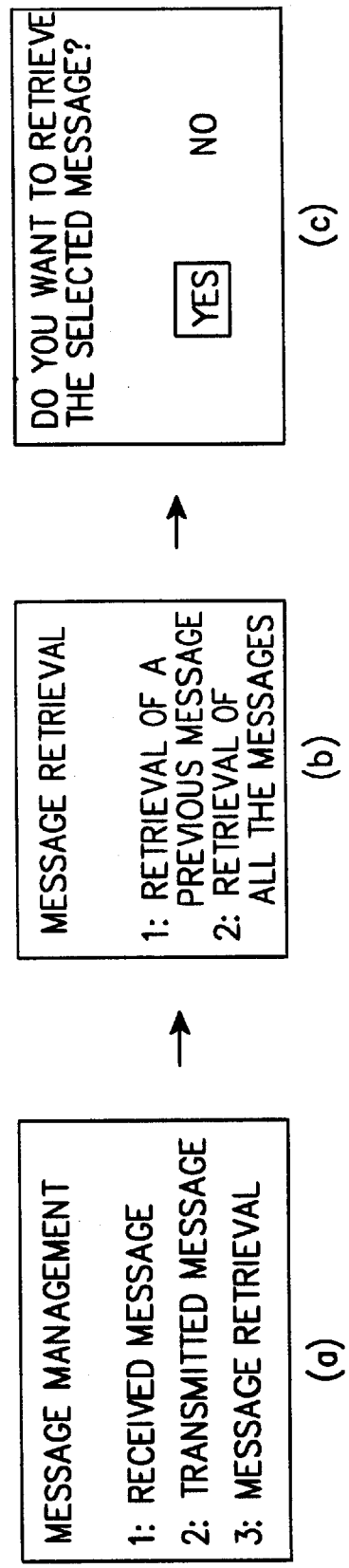
FIG. 4 is a diagram exemplifying a display of a message retrieval process according to a preferred embodiment of the present invention.

If a user selects a message management menu among menus in a mobile telecommunication terminal in order to retrieve a deleted message, a control section 100 responds thereto in step 300 as shown in FIG. 3, and displays the message management menu on a screen of the display section as shown in FIG. 4(*a*) in step 302. Accordingly, the user can select a desired item from the message management menu. Thereafter, the control section 100 detects whether or not a message retrieval item is selected from the message management menu in step 304. If another item than the message retrieval item is selected, the control section 100 performs a normal operation corresponding to the selection of the items in step 306.

However, if the user selects the message retrieval item, according to a preferred embodiment of the present invention, the control section 100 responds thereto in step 304, and displays the message retrieval item, i.e., comprising 1: retrieval of a previous message, 2: retrieval of all the messages as shown in FIG. 4(*b*), in step 308. The item reading "retrieval of a previous message" means an item for retrieving the lately deleted message, while the item reading "retrieval of all the messages" means an item for retrieving all the ever deleted messages. Accordingly, the user can select a desired item for a message retrieval from the message retrieval menu displayed on the screen. If the user here selects the item for retrieval of a previous message, the control section 100 responds thereto in step 310, and receives an SMS index number to be retrieved from the user in step 312. Thereafter, the control section 100 restores the SMS index number from "FF" to "0" in step 314. The control section searches a message storage block matched with the SMS index number within an EEP-Rom, so that a message existence identifier of the pertinent message block restores the data into the same SMS index number to be matched with the SMS index number. Further, a message retrieval identifier converts it into "FALSE," so as to retrieve the deleted message.

Then, the control section 100 detects whether or not the message is to be retrieved, by displaying a message querying the user again that the message selected in the step 312 is still required to be retrieved as shown in FIG. 4(*c*) in step 320. Subsequently, the user optionally inputs a key representing "yes" in case the message retrieval is required, upon notice of the displayed screen. The control section 100 then recognizes the selection by the user and retrieves the message corresponding to the pertinent SMS index number in step 322.

If the user selects the item for retrieval of all the messages in step 308, however, the control section 100 responds thereto in step 316 so that the control section 100 retrieves all the deleted messages stored in the message storage blocks which the message existence identifier within the EEP-Rom is "FF" but the message retrieval identifier is not "FF". Thereafter, the control section 100 reconfirms the demand for retrieval of all the messages by the user in step 320, and retrieves all the deleted messages in the EEP-Rom in step 322.

As described above, a variable for a message retrieval is added to the short message storage memory so as to retrieve deleted short messages if necessary, thereby serving to drastically increase the user convenience telecommunication in retrieving the messages.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for retrieving short message service (SMS) messages in a mobile telecommunication terminal, comprising the steps of:
   storing deleted SMS messages in an additional data area divided into a plurality of message storage blocks, which include a message existence identifier and a message retrieval identifier;
   if there is a demand for retrieval of a previously deleted message by a user, receiving an SMS index number to be retrieved;
   setting a message stored status identifier matched with the SMS index number to be retrieved to indicate storage of a previously deleted message;
   searching a message storage block matched with the SMS index number from the message storage blocks;
   setting the message existence identifier of the searched message storage block to indicate an existence of a message; and
   setting the message retrieval identifier of the message storage block to indicate a retrieval of the message.

2. The method of claim 1, wherein the message retrieval identifier is provided in a start address data region of each message storage block to identify whether or not the message stored in a pertinent message block has been retrieved.

3. The method of claim 1, wherein the message existence identifier is provided in a start address data region of each respective message storage block to identify whether or not the message stored in a pertinent message block has been deleted.

4. The method of claim 1, wherein the message stored status identifier identifies whether or not the message stored with the SMS index number has been stored.

5. A method for retrieving short message service (SMS) messages in a mobile telecommunication terminal, comprising the steps of:
   storing deleted SMS messages in an additional data area divided into a plurality of message storage blocks, which include a message existence identifier and a message retrieval identifier;
   if there is a demand for retrieval of all the deleted messages by a user, searching the plurality of message storage blocks in which the message existence identifier indicates storage of messages that have been deleted;
   re-searching the message storage blocks in which the message existence identifier indicates that the messages are retrievable, from the searched message storage blocks; and
   setting the message retrieval identifier of the message storage blocks that the re-searching indicated retrievable, messages exist, thereby retrieving all deleted messages.

6. The method of claim 5, wherein the message retrieval identifier is provided in a start address data region of each message storage block to identify whether or not the message stored in a pertinent message block has been retrieved.

7. The method of claim 5, wherein the message existence identifier is provided in a start address data region of each message storage block to identify whether or not the message stored in a pertinent message block has been deleted.

* * * * *